Figure 1:
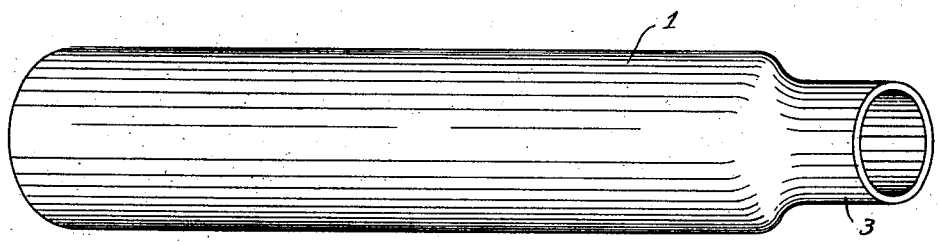

No. 745,254. PATENTED NOV. 24, 1903.
J. P. SNEDDON.
METHOD OF MAKING TUBULAR ARTICLES PROVIDED WITH DIAPHRAGMS.
APPLICATION FILED FEB. 14, 1903.
NO MODEL. 2 SHEETS—SHEET 1.

Witnesses.
Fred D. Sweet.
F. W. Winter

Inventor.
James P. Sneddon,
By Kay & Totten,
Attorneys.

No. 745,254. PATENTED NOV. 24, 1903.
J. P. SNEDDON.
METHOD OF MAKING TUBULAR ARTICLES PROVIDED WITH DIAPHRAGMS.
APPLICATION FILED FEB. 14, 1903.
NO MODEL. 2 SHEETS—SHEET 2.
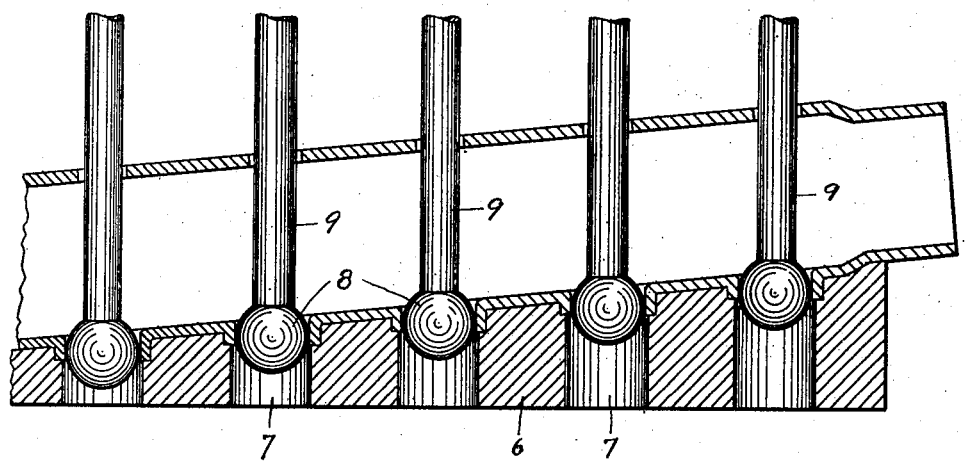
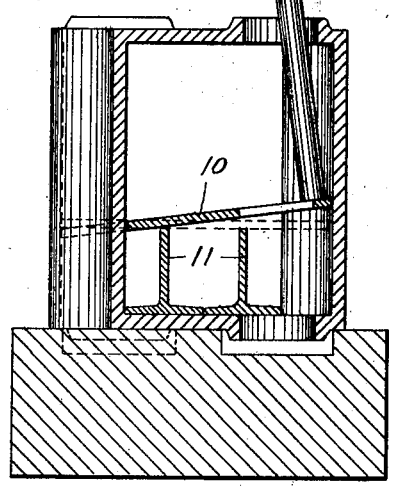
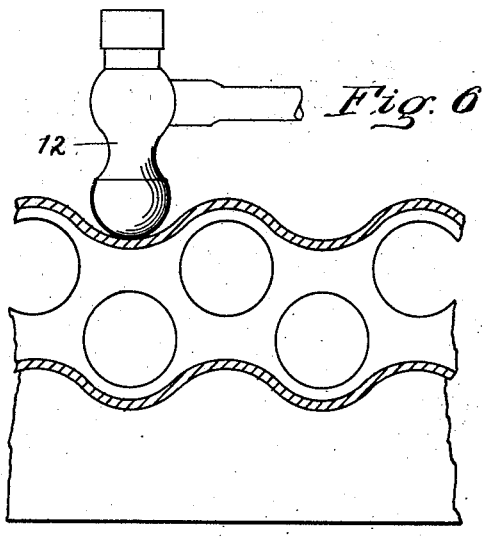

No. 745,254. Patented November 24, 1903.

UNITED STATES PATENT OFFICE.

JAMES P. SNEDDON, OF BARBERTON, OHIO, ASSIGNOR TO THE STIRLING COMPANY, OF CHICAGO, ILLINOIS, A CORPORATION OF NEW JERSEY.

METHOD OF MAKING TUBULAR ARTICLES PROVIDED WITH DIAPHRAGMS.

SPECIFICATION forming part of Letters Patent No. 745,254, dated November 24, 1903.

Application filed February 14, 1903. Serial No. 143,350. (No model.)

*To all whom it may concern:*

Be it known that I, JAMES P. SNEDDON, a resident of Barberton, in the county of Summit and State of Ohio, have invented a new and useful Improvement in Methods of Making Tubular Articles Provided with Diaphragms; and I do hereby declare the following to be a full, clear, and exact description thereof.

My invention relates to a method of forming hollow or tubular metal articles of irregular outline longitudinally and provided with a diaphragm, such as serpentine boiler-headers and the like.

The object of my invention is to provide a method of producing such articles wherein the tube is first formed to the desired shape before the diaphragm is inserted and secured therein, so that said diaphragm will not be subjected to the heats necessary in shaping the header or other tubular article.

In my Patent No. 693,174, granted February 11, 1902, is described and claimed a method of making hollow or tubular articles, such as serpentine boiler-headers and the like, provided with a longitudinal diaphragm, said method consisting in supporting the shaped diaphragm longitudinally within the tube and then pressing the walls of the latter down against the edges of the diaphragm, thereby shaping the tubular article and also causing the edges of the diaphragm to become embedded in the walls of the tube, so that it is held in place. In the manufacture of such articles, especially when used for headers for steam-boilers, it is necessary after shaping the same to form holes in the flat side walls of the header and then turn the metal around these holes outwardly to form flanges for the purpose of providing proper seats for the water-tubes. During the flanging operation it is usually necessary to reheat the header twice, once for flanging the holes on one side and again for flanging the holes on the opposite side. These reheatings necessarily affect the diaphragm, and in case the latter is very thin it is liable to warp, buckle, or be otherwise detrimentally affected.

The object of the present invention is to provide a method of making such tubular articles and inserting the diaphragm therein whereby the above defects are overcome.

To this end it consists, generally stated, in first forming the wrought-iron tube into the desired irregular shape longitudinally with holes in the opposite walls thereof and flanges around said holes, after which the diaphragm is inserted therein and secured in place, this preferably being done by reheating the shaped tube, inserting therein a properly-shaped diaphragm and bringing the same to its proper position, and then permitting the tube to cool, thus causing it to shrink down onto the edges of the diaphragm to firmly bind the same in place.

The invention also comprises the swaging down of the walls of the tube onto the edges of the diaphragm to further assist in securing the diaphragm firmly in place.

The accompanying drawings show diagrammatically the various steps of forming a serpentine boiler-header according to my method, and in said drawings—

Figure 2:
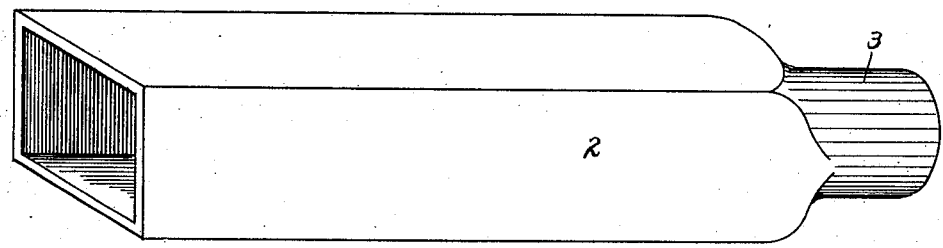
Figure 3:
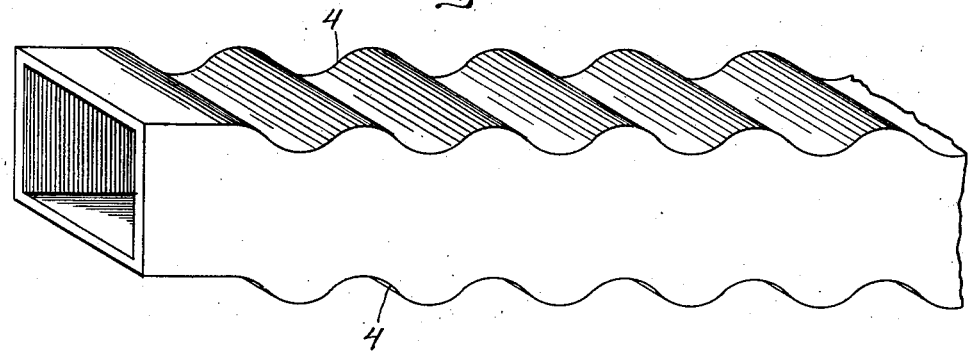

Figure 1 is a perspective view of a round tube having a neck formed at one end. Fig. 2 is a similar view of the tube after being brought to square or rectangular form. Fig. 3 is a view of the tube after having been corrugated or brought to serpentine form. Fig. 4 illustrates the step of flanging the holes in the side walls of the header. Fig. 5 illustrates the step of inserting the diaphragm and forcing it into position, and Fig. 6 illustrates the manner of swaging the walls down onto the edges of the diaphragm.

In carrying out my invention the header or other tubular article of irregular outline longitudinally may be formed in any desired way preparatory to having the diaphragm placed therein; but in the making of serpentine boiler-headers, such as shown in the drawings, the preferred method of procedure is to start with either a round tube 1, as shown in Fig. 1, or with a square tube 2, such as shown in Fig. 2, depending upon which particular tube can be more readily obtained in the open market. The first step is to swage down the end of the tube to form the neck 3, this being done in any convenient way and by any convenient means, such as concave hammer-dies.

If a round tube is used, it will after swaging down the neck be squared or brought to the rectangular form, as shown in Fig. 2, and this step likewise may be performed in any suitable way or by any suitable apparatus, preferably by inserting in the tube a suitable mandrel and then squeezing the tube down onto the same by suitable pressure-platens operated by a hydraulic press. For both of these steps—namely, forming the neck and squaring—the tube will be heated to the proper working temperature.

The next step in the process is to provide the tube with the desired irregular configuration longitudinally, and in making corrugated or serpentine boiler-headers this consists in forming corrugations 4 in two opposite walls of the rectangular tube, and this likewise may be done by any apparatus suitable for this purpose, several forms of which are well known to persons skilled in this art. Preferably the corrugations in the opposite faces will be alternately arranged, as shown, so as to give to the tube a staggered or serpentine shape. For this step of the process also the tube must be heated to the proper working temperature. After the tube has been given the proper irregular shape longitudinally the necessary holes for the water-tubes are bored in the two flat walls thereof, after which the metal surrounding said holes must be turned out to form flanges in order to provide seats for the water-tubes. This flanging can be done in any suitable way and in any suitable apparatus, but preferably by apparatus such as illustrated in Fig. 4, wherein the tube is supported on a suitable anvil or die 6, having holes or recesses 7 therein corresponding in number, dimensions, and position to the holes in the header. The flanging is done by forcing through the holes in the header-walls, when thus supported, a suitable implement or projectile 8, which may be either a sphere, half-sphere, section of ellipse, section of cone, or other suitable shape, but which for convenience of illustration is shown as a sphere. This implement or projectile is forced through the holes in the header-wall by means of a suitable plunger 9, which may be actuated in any suitable way, or, vice versa, the plunger may be held stationary and the anvil or die 6 actuated. In either event the projectile is forced through the opening in the lower wall of the tube and turns the metal surrounding said opening outward to form a flange, as shown. In the preferred manner of carrying on this step the anvil or bed 6 will be formed of sufficient length to accommodate the entire header, and a series of projectiles 8 will be employed corresponding in number to the holes in the lower wall of the header, while a corresponding series of punches will be used for forcing all of said balls simultaneously through the holes in the header-wall, thus flanging all of the holes in one of the walls of the header at a single operation. This operation will then be repeated on the holes in the opposite header-wall. For this flanging step the header must be raised to a good forging heat, and generally it will be found necessary to heat the same twice, once for flanging the holes on one side and again for flanging the holes on the opposite side. The header is now ready for the insertion of the diaphragm.

It will be understood that while the foregoing description applies entirely to the manufacture of the specific article shown—a serpentine wrought-metal header—the invention is not limited thereto, but is equally applicable to the manufacture of various other tubular articles of irregular outline longitudinally and provided with a diaphragm. The specific steps so far described, however, may not all be necessary for the formation of articles other than boiler-headers, and it will be understood that the only essential step so far described is forming the wrought-iron tube into the desired irregular shape longitudinally, whatever that shape may be, preparatory to the application of a diaphragm. In all cases, however, all of the shaping of the tube which requires a heating thereof will be completed prior to the insertion of the diaphragm, so that the latter will not be detrimentally affected by the heatings necessary in the shaping of the tube.

The diaphragm is first properly shaped, being formed approximately of the same shape as the interior of the tubular article, and in the specific article shown in the drawings the diaphragm 10 will be formed with wavy or serpentine edges. The shaped tube is then again reheated and the diaphragm inserted therein and properly positioned, after which the tube is permitted to cool, thus shrinking down into the edges of the diaphragm and firmly securing the latter in place. To secure the best results, it is necessary for the diaphragm to fit fairly tight in the hot or expanded tube. In order to bring such a tight-fitting diaphragm into proper position, preferably the mode of procedure illustrated in Fig. 5 is employed. In this the diaphragm is placed in the tube in a transversely-inclined position, with both edges thereof resting against the walls of the tube. A suitable support is then placed in the tube underneath the diaphragm, said support preferably consisting of a pair of parallel bars 11 of such a height that when the diaphragm is forced down upon the same it will be the proper distance from the lower wall of the tube and parallel thereto. The lower edge of the diaphragm, preferably, will rest upon one of these parallel bars. By means of suitable pins or other tools inserted through the holes in the upper wall of the diaphragm the elevated edge of the diaphragm is driven down into place, as indicated in Fig. 5, until the diaphragm rests upon the parallel bars, after which the latter are withdrawn. This results in wedging the diaphragm firmly between the two opposite corrugated walls of the hot tube, and as the latter cools and shrinks it naturally binds on the edges of the diaphragm with sufficient firmness to hold the latter in position. If the edges of the diaphragm have been accurately shaped with reference to the shape of the tubular article, practically a tight joint will be formed between the same and the walls of the tube. To further assist, however, in securing the diaphragm in place and form a tight joint between the same and the walls of the tube, it is preferred to swage the corrugated walls of the latter down upon the edges of the diaphragm. This can be done by any suitable tool—such, for instance, as the sledge or swage 12 shown in Fig. 6—and preferably this swaging will be done mostly in the concave depressions of the corrugated walls, thus driving the metal of these portions down into the concave portions of the edges of the diaphragm.

As a result of the method described the shaped diaphragm will be firmly held in the header or other tubular article and will form practically a tight joint with the walls thereof. Furthermore, the tubular article having first been given the desired shape need not be reheated after the diaphragm has been applied thereto, so that the diaphragm, even though composed of thin metal, will not buckle, warp, or be otherwise detrimentally affected.

What I claim as my invention, and desire to secure by Letters Patent, is—

1. The method of forming wrought-metal tubular articles of irregular outline longitudinally and provided with a longitudinal diaphragm, which consists in forming a wrought-iron tube into the desired irregular shape longitudinally, thereafter heating the same, inserting therein a diaphragm shaped to correspond to the irregular shape of the tube, and then permitting the tube to cool and shrink onto the edges of the diaphragm.

2. The method of forming wrought-metal tubular articles of irregular outline longitudinally and provided with a longitudinal diaphragm, which consists in forming a wrought-iron tube into the desired irregular shape longitudinally, thereafter heating the same, inserting therein a diaphragm shaped to correspond to the irregular outline of the tube, and then swaging portions of the walls of the tube down onto the edges of the diaphragm.

3. The method of forming wrought-metal tubular articles of irregular outline longitudinally and provided with a longitudinal diaphragm, which consists in forming a wrought-iron tube into the desired irregular shape longitudinally, thereafter heating the same, taking a diaphragm shaped to correspond to the irregular outline of the tube and inserting the same in the heated tube in a transversely-inclined position with one edge thereof substantially in proper position, forcing down the other edge thereof to bring the diaphragm into proper position, and then permitting the tube to cool and shrink onto the edges of the diaphragm.

4. The method of forming wrought-metal tubular articles provided with transverse corrugations and with a longitudinal diaphragm, which consists in forming a wrought-iron tube with transverse corrugations, thereafter heating the same, inserting therein a diaphragm having corrugated or wavy edges, and then swaging the walls of the tube down into the depressed or concave portions of the edges of said diaphragm and permitting the tube to cool whereby it will shrink down onto the edges of the diaphragm.

5. The method of forming wrought-metal boiler-headers provided with a longitudinal diaphragm, which consists in forming a wrought-iron tube into the desired shape, forming holes in opposite side walls thereof, flanging the metal around said holes, then reheating said header, inserting therein a diaphragm shaped to correspond to the outline of the header, and then permitting the header to cool whereby it will shrink down onto the edges of the diaphragm.

In testimony whereof I, the said JAMES P. SNEDDON, have hereunto set my hand.

JAMES P. SNEDDON.

Witnesses:
E. E. BAKER,
J. C. FRANK.